United States Patent [19]

Block

[11] 4,264,455
[45] Apr. 28, 1981

[54] DRILLING MUD VISCOSIFIER

[75] Inventor: Jacob Block, Rockville, Md.

[73] Assignee: W. R. Grace & Co., New York, N.Y.

[21] Appl. No.: 952,304

[22] Filed: Oct. 18, 1978

[51] Int. Cl.³ .............................................. C09K 7/04
[52] U.S. Cl. .............................. 252/8.5 B; 252/8.5 A; 252/317
[58] Field of Search .............. 252/8.5 B, 8.5 A, 8.5 R, 252/317

[56] References Cited

U.S. PATENT DOCUMENTS

| | | | |
|---|---|---|---|
| 3,185,642 | 5/1965 | Sawyer et al. | 252/8.5 |
| 3,319,715 | 5/1967 | Parks | 252/8.5 X |
| 3,508,869 | 4/1970 | Shoaff | 252/317 X |
| 3,850,817 | 11/1974 | Barthel | 252/8.5 |
| 3,975,283 | 8/1976 | Braithwaite et al. | 252/317 X |
| 3,988,246 | 10/1976 | Hartfiel | 252/8.5 |
| 4,025,443 | 5/1977 | Jackson | 252/8.5 |

OTHER PUBLICATIONS

Partington, *A Textbook of Inorganic Chemistry*, Sixth Edition, pub. 1950 by MacMillan and Co., London, p. 774.
Knibbs, *Lime and Magnesia*, pub. 1924 by D. van Nostrand Co., New York, pp. 70 and 74.

Primary Examiner—Herbert B. Guynn
Attorney, Agent, or Firm—Howard J. Troffkin

[57] ABSTRACT

Water-based, clay-free drilling fluids for use in drilling bore holes into subterranean formations having an aqueous system therein comprising water and a hydroxy magnesium containing reaction product. The aqueous system of the drilling fluid has the subject reaction product therein in an amount sufficient to impart non-Newtonian, pseudoplastic properties to the fluids when the fluids have a pH above at least about 11. The present invention further relates to an improved process of drilling bore holes into subterranean formations using the subject drilling fluids.

7 Claims, 1 Drawing Figure

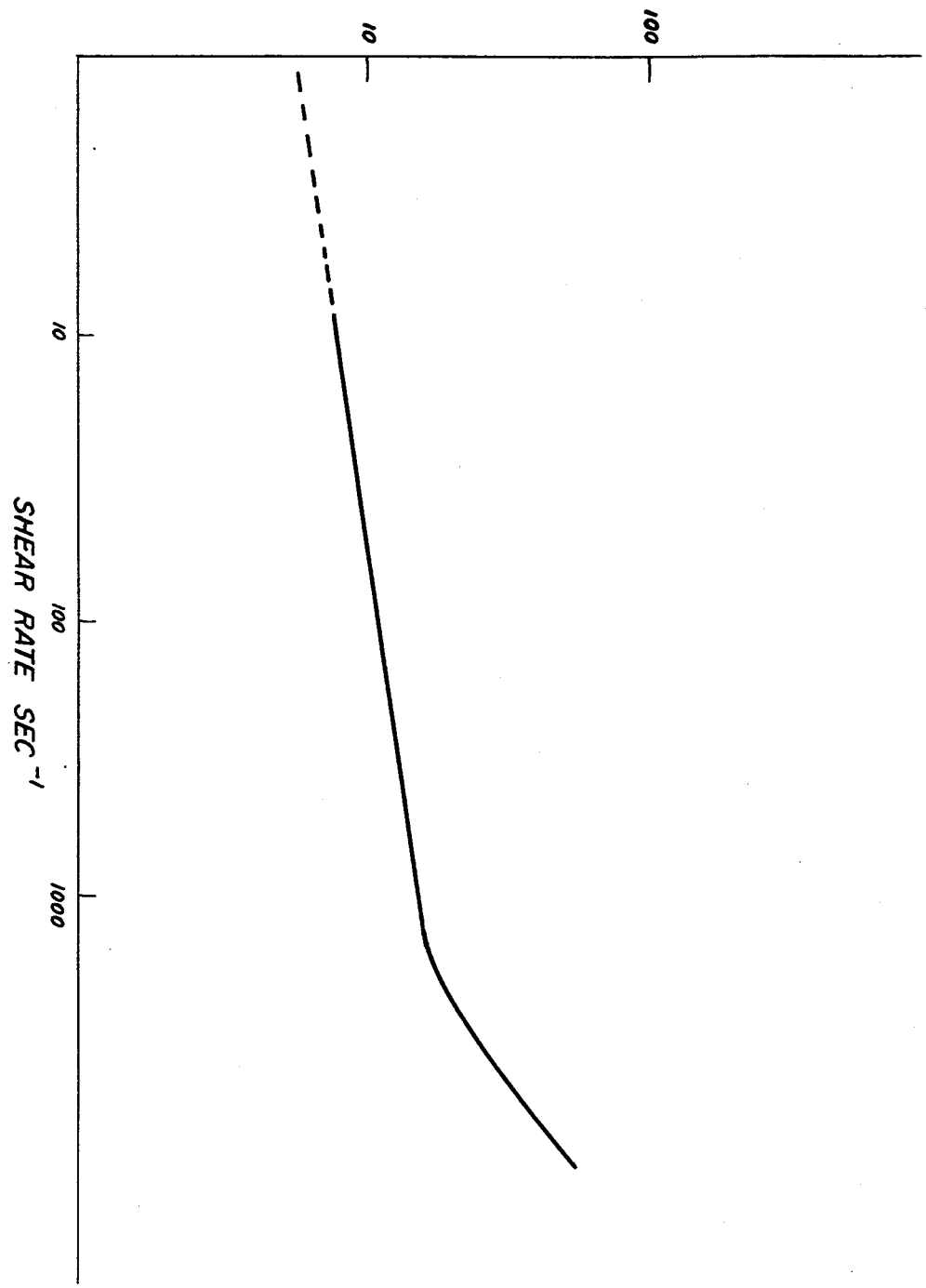

DRILLING MUD VISCOSIFIER

BACKGROUND OF THE INVENTION

The present invention relates to the formation of water-based, clay-free drilling fluids containing an effective amount of a hydroxy magnesium containing reaction product as the agent to impart viscosity and pseudoplastic properties to the fluid and to methods of using such fluids in the drilling of subterranean soil.

In normal well drilling operations in which a bore hole is drilled by a rotary method, the bore hole is generally filled with a drilling fluid or mud which is circulated therein. Drilling fluids are usually pumped down through the drill stem of the rotary rig, circulated around the drill bit and returned to the surface through an annular passage between the drill stem and well casing. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

A primary requisite of a satisfactory drilling fluid is its ability to readily circulate and flow, that is, to have low viscosity, under the high shear conditions which are present in the environs of the drill bit while, at the same time, also being capable of exhibiting comparatively high viscosities and carrying power under varying low shear conditions which are exerted in the annular passage between the drill stem and the well casing during the fluid's upward flow movement. In generic terms, the drilling fluid must exhibit non-Newtonian properties as a pseudoplastic fluid, especially under varying low shear rates such as are encountered in the annular passage.

The drilling fluid should also be capable of exhibiting the above described pseudoplastic properties under changing conditions encountered during the drilling operation due to the fact that the bore hole traverses various strata such as shales, clay, etc., and the cuttings of these materials become dispersed in the fluid media. The drilling fluid components should, therefore, be substantially stable to the presence of various calcium compounds and to sodium chloride which may be present in the fluid from the soil strata with which it is in contact and/or due to the use of salt water used to form the drilling fluid.

It is also well known that as the bore hole increases in depth the temperatures encountered substantially increase above that found at the earth's surface. This is especially a problem found in drilling of depths greater than about 9,000 feet as is presently becoming a more common practice. In addition, heat is generated by frictional forces on the drill bit. It is, therefore, not uncommon for the drilling fluids to encounter temperatures of 200° F. or greater. Components used in forming drilling fluids should be stable with respect to elevated temperature conditions.

A wide variety of drilling fluids have been used, including aqueous based liquids, hydrocarbon based liquids, air and other gases, mist, foams and the like. Since great volumes of drilling fluids are required for the purposes of providing a cooling medium for the rotary bits and a means of carrying off the drilled particles, most of the conventional fluids used have been based on water. Water, being a Newtonian fluid, does not have the needed capability to efficiently carry the drilled particles from the bore hole to the surface. This becomes increasingly apparent as the bore hole increases in depth.

It is a widely held and accepted theory that the viscosities suitable for creating a particle carrying capacity in the fluid can be achieved with the drilling fluid having pseudoplastic properties, that is, that the viscosity must be sufficient to prevent the drilled particles from separating from the drilling fluid when the fluid is under the influence of low shear forces of about 10 to about 400 to 800 sec$^{-1}$ such as encountered in the annular passage. In order to obtain the requisite pseudoplastic properties, it has been thought desirable to use certain clay or colloidal clay bodies such as bentonite or attapulgite clays. As a result, the drilling fluids have been usually referred to as "muds". The use of clay-based drilling fluids has provided the means of initially meeting the two basic requirements of drilling fluids, i.e., cooling and particle removal. However, these clay-based drilling fluids are highly unstable when they come in contact with various salts commonly found in drilled earth formations.

Materials which have come into expanding use as the viscosifying agents of drilling compositions are Xanthan gums such as are described in U.S. Pat. Nos. 3,198,268; 3,208,526; 3,251,147; 3,243,000; 3,307,016 and 3,319,715. These materials have been found to cause aqueous drilling fluids to exhibit pseudoplastic properties under varying low shear forces. These materials, however, whether used alone or in combination with other additives, are irreversibly degraded by the elevated temperatures often encountered during conventional drilling operations. The high cost of the Xanthan gums and the high rate of degradation limit their usefulness to specialized operations.

Magnesium compounds have been previously used as a component of drilling fluids. U.S. Pat. No. 2,856,356 to Weiss, U.S. Pat. No. 2,828,258 to Thompson and U.S. Pat. No. 3,185,642 to Sawyer et al each disclose the inclusion of a water soluble amount of magnesia or magnesium hydroxide as a stabilizing agent in clay muds. The viscosifying agent of these muds are those specialized clays, such as attapulgite, discussed hereinabove.

Clay-free fluids have also contained magnesium compounds as stabilizing agents for the components of the fluid. For example, U.S. Pat. No. 4,025,443 to Jackson discloses a clay-free fluid which uses a hydroxy alkyl guar gum as the thickening agent and incorporates magnesium oxide or hydroxide slightly in excess of its solubility to maintain a suitable soluble hydroxyl concentration in the fluid in order to stabilize the guar gum. Similarly, U.S. Pat. No. 3,988,246 to Hartfiel stabilizes Xanthan gum based drilling fluids with modified starch and a stabilizing amount of magnesium oxide. Finally, in place of the stabilizing amount of magnesium oxide or hydroxide as disclosed in the above teachings, U.S. Pat. No. 3,850,817 to Barthel discloses that magnesium carbonate and an ammonium salt, such as ammonium chloride, when subjected to elevated temperature and pressure conditions may produce a water soluble amount of the hydroxide stabilizing agent as used by the prior art.

The prior art drilling fluids have generally used magnesium compounds as stabilizers for clay based muds or as an agent of a clay-free fluid under conditions which would not cause the magnesium compound to exhibit the desired pseudoplastic properties and to thus effectively aid in the drilling of bore holes.

There is a general need for a drilling fluid viscosifier which is capable of being produced at low cost, which renders an aqueous drilling fluid pseudoplastic so as to exhibit ease of fluidity under high shear conditions such as found at the drill bit site, while exhibiting an increased, substantially stable viscosity under low shear conditions and which is substantially stable under conditions normally encountered in drilling a bore hole.

SUMMARY OF THE INVENTION

It is an object of the present invention to form water-based, clay-free fluids which exhibit non-Newtonian, pseudoplastic properties so as to be capable of drilling bore holes and the like in an efficient manner. Further, it is the object of the present invention to form a drilling fluid which is substantially stable to varying environmental conditions of temperature and salt content normally encountered in bore hole drilling.

The present invention is directed to clay-free drilling fluids useful in effectively aiding the drilling of bore holes and the like into subterranean strata wherein the fluid is a water-based fluid having a pH of at least about 11 and containing a hydroxy containing magnesium reagent dispersed or suspended therein in an effective amount to impart viscosity and pseudoplasticity to the fluid.

BRIEF DESCRIPTION OF DRAWING

FIG. 1 represents a typical curve of shear stress vs. shear rate for fluids formed in accordance with the present invention.

DETAILED DESCRIPTION OF THE INVENTION

The present invention is directed to a viscosifier for water-based, clay-free drilling fluid compositions which cause the composition to exhibit pseudoplastic properties, and to methods of drilling bore holes into the earth by utilizing the subject drilling fluid composition. Specifically, the subject invention is directed to drilling fluid compositions comprising water and a hydroxy containing magnesium reaction product as the viscosifying and pseudoplasticizing agent.

The magnesium reaction product found useful according to the present invention are agents which are substantially water-insoluble, that is, agents which are in suspension or dispersion in aqueous systems having a pH of at least about 11. The subject reaction products are formed in an aqueous media from a water soluble magnesium compound and a water soluble base mixed under a high degree of agitation. The resultant aqueous system must have a pH of at least about 11 and contain the desired magnesium reaction product in suspension or dispersion therein. It has been found that the preferred reaction product is formed by subjecting the resultant aqueous system containing the formed magnesium reaction product to high shear forces for about 5 to 60 minutes.

The subject reaction product is formed from a magnesium salt which is substantially completely soluble in water at ambient temperatures. Such magnesium salts are, for example, magnesium halides including magnesium chloride, magnesium bromide and the like, magnesium sulfate, magnesium nitrate, magnesium acetate and the like as well as their hydrates. It is preferred to use a water soluble inorganic salt with magnesium chloride or sulfate being most preferred.

The magnesium salt is reacted with a water soluble base. Suitable bases include inorganic bases which contain or produce hydroxide groups when in contact with water as, for example, alkali metal oxides or hydroxides or alkaline earth metal oxides or hydroxides such as sodium or potassium hydroxide, calcium oxide and the like as well as ammonium hydroxide. The base can also be selected from salts of weak acids and strong bases. The preferred bases are alkali metal hydroxides. The base should be used in at least stoichiometric amounts with respect to the magnesium salt and preferably in excess of stoichiometry to produce a resultant aqueous media which has a pH of at least about 11 with a pH of between 11 and 12.5 being most preferred.

The desired hydroxy containing magnesium reaction product is formed by mixing the above described reactants in an aqueous media at a temperature of from ambient to about 40° C. under a high degree of agitation. The agitation should preferably incur moderate shear forces in the aqueous system during mixing as can be readily obtained by conventional high speed mixers such as high speed dispersant or high speed emulsion mixers. The resultant aqueous system containing the dispersion or suspension of the magnesium reaction product is preferably subjected to high shear mixing to further enhance the rheological properties as described hereinbelow. The high shear mixing can be done by any conventional method capable of achieving shear rates of at least about 20,000 sec$^{-1}$ for about 5 to 60 minutes, such as by circulating the aqueous system through a small orifice I.D. tube at a high rate of circulation.

Each of the reactants can be present in the aqueous media in from about 2 to 50 percent or greater by weight based on the water as long as the concentration is not such as to inhibit the thorough mixing of the reactants. The subject reaction product in the resultant aqueous system is presumably magnesium hydroxide in an insoluble form as a suspension or dispersion. The amount of the product should be sufficient to cause the system to exhibit the desired rheological properties as described hereinbelow.

The subject hydroxy containing magnesium product can also be formed by the hydrolysis of commercial light-burnt magnesium oxide. The light-burnt magnesium oxide is agitated in an aqueous system under a high degree of agitation, as discussed above, for a sufficient time to permit the oxide to convert into a hydroxide.

The aqueous system in which the subject magnesium reaction product is formed can be directly used to form the water-based drilling fluids of the subject invention by diluting the aqueous system with a sufficient amount of water to form a fluid having an effective amount of the subject hydroxy containing magnesium reaction product therein which imparts the desired rheological properties. Normally, concentrations of from 1 to 10 percent, and preferably from 2 to 6 percent, by weight based on the weight of the water impart the desired properties. The concentration most suitable can be readily determined in conventional manners by the mud engineer taking into consideration the concentration and nature of other materials which may also be contained in the drilling fluid. The pH of the water-based drilling fluid should be maintained within the ranges described above.

The above-described magnesium reaction product is capable of causing a clay-free, (the term "clay-free"

when used herein refers to the absence of drilling fluid viscosifying clays as an essential agent of the fluid and not to other materials entrained therein) water-based drilling fluid (the term "fluid" or "system" when used herein refers to water containing the above described magnesium reaction product of the subject invention in suspension or dispersion) to have suitable rheological properties of viscosity and non-Newtonian, pseudoplasticity, that is to say, that the viscosity of the resultant water-based drilling fluid varies inversely with respect to the shear rate exerted on the fluid. The relationship of the shear stress with respect to shear rate can be defined by the rheological power law model relationship of $$\tau = K(\dot{\gamma})^n$$

in which $\tau$ represents the shear stress exerted on the aqueous system of the drilling fluid in units such as pounds per 100 ft$^2$ or dynes/cm$^2$; $\dot{\gamma}$ is the shear rate in units of reciprocal time such as sec$^{-1}$; K is a constant having the value of the shear stress of the particular system at a shear rate of 1 sec$^{-1}$; and n is a numerical value of from 0 to 1. It has been unexpectedly found that water-based drilling fluids containing the presently described magnesium hydroxide viscosifying agent exhibit shear stress ($\tau$) properties at varying shear rates ($\dot{\gamma}$) in the range of from about 10 to 400 sec$^{-1}$, that is, in the range normally encountered in the annular region of the bore hole, such that n of the power law relationship has a value of less than about 0.4. Such systems, exhibit only small changes in shear stress with respect to large changes of shear rates and therefore exhibit non-Newtonian, pseudoplastic properties to an exceptionally high and desirable degree.

FIG. 1 is a typical graphic presentation of the shear stress at varying shear rates which are obtained from aqueous solutions containing the presently disclosed product. When plotting log shear stress versus log shear rate, with log shear stress being plotted on the abscissa and log shear rate on ordinate of the graph, the desired properties are readily apparent. At low shear rates, such as from about 10 to about 400 sec$^{-1}$, as are encountered in the annular region of the bore hole, the shear stress should increase at a low rate with respect to the shear rate exerted on the material which is observed as a low slope (or n value according to the power law relationship) of the curve. The lower the slope or n value within this region the more desirable the fluid. In certain instances the slope may continuously or segmentally change but should retain an n value of about 0.4 or less. At high shear rates, as are found in the region of a drill bit in a drilling operation, the fluid should have a low viscosity, that is approach the viscosity of water since this permits high drilling rates. At such shear rates the fluid approaches a Newtonian liquid as can be seen by an increased slope of the curve (n having a value approaching or equal to unity). The value for K in the power law relationship is the shear stress value determined or extrapolated for a shear rate of 1 sec$^{-1}$ and is directly proportional to the viscosity of the aqueous system.

In addition to presently finding that the subject magnesium reaction product imparts desired viscosity and pseudoplasticity to water-based drilling fluids, it has been found that such fluids are substantially unaffected by variations of temperature, such as elevated temperatures as are found in bore holes even over sustained periods of time, by high shear forces such as are encountered at the site of the drill bit, by the presence of various corrosive elements such as calcium chloride and sodium chloride which are commonly entrained in such fluids, as well as various other adverse conditions.

The high degree and breadth of stability of the presently achieved drilling fluid, when combined with its ability to exhibit non-Newtonian, pseudoplastic properties under varying low shear rates of from about 10 to 400 sec$^{-1}$ and greater, such as are encountered in the annular region between the drill stem and the casing of the bore hole, aids in increasing the drilling efficiency, that is, the rate of drilling the bore hole.

The drilling fluid composition of the subject invention can contain other conventional drilling fluid additives such as water loss inhibitors as, for example, polyanionic cellulose and the like, and weighting agents as, for example, crushed oyster shells, barite, and the like. The subject drilling fluid should be free of other viscosifying agents commonly used such as Xanthan gums and the like which are unstable under conditions commonly found in drilling of bore holes and the like.

The term "water-based" which is used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil formation drilled into or, under certain conditions, can be purposely added.

This material can be used with conventional bore hole drilling equipment in manners known to those skilled in the art to efficiently and effectively drill bore holes into subterranean formations. The pseudoplastic properties of the present drilling fluids permits effective removal of the cuttings from the area at and around the drill bit to permit more efficient drilling of the formation.

The following examples are given for illustrative purposes only, and are not meant to be a limitation on the subject invention except as indicated by the appended claims. All parts and percentages are by weight unless otherwise indicated. The values of K of the power law model relationship are in lb-sec/100 ft$^2$.

EXAMPLE I 235.1 parts of a magnesium sulfate solution, formed from 200 parts magnesium sulfate and 967 parts water, were placed in a high speed mixer. Under high speed mixing, 131.8 parts of a 10 N sodium hydroxide solution were added. The resultant slurry had a pH of 12.3. The slurry was circulated for 30 minutes through a stainless steel tube having an I.D. of 0.0157 inch. The slurry was then diluted 1:1 with water to give a hydroxyl magnesium agent concentration of 2.7 per cent.

The rheological properties were determined using standard procedures with a Haake Rotovisco RV-1 viscometer at shear rates of from about 10 to 1300 sec$^{-1}$. The n and K values of the power law model relationship was determined to be 0.26 and 9.2, respectively, for low shear rates of from 10 to about 400 sec$^{-1}$.

EXAMPLE II

The sample prepared in Example I above was subjected to thermal stability testing by placing the material in a stainless steel bomb, flushing with N$_2$ gas, pressurizing with N₂ gas to 50 psig and, while under agitation, maintaining 250° F. for 16 hours. The material was cooled to ambient temperature, and tested for rheology properties as described in Example I above. The n and K values were determined to be 0.25 and 3.1 respectively.

EXAMPLE III

Samples of material prepared in accordance with Example I above were tested for stability to divalent ions and sodium chloride by adding calcium chloride or sodium chloride to samples and measuring their resultant rheological properties. The determined values for n and K of the power law model relationship are given below:

| Additive | n | K |
| --- | --- | --- |
| 0.5% CaCl₂ | 0.16 | 8.8 |
| 5% CaCl₂ | 0.25 | 11.1 |
| 3.5% NaCl | 0.20 | 12.8 |
| 10% NaCl | 0.21 | 11.8 |

The results of Examples I, II and III show that the subject fluids exhibit pseudoplastic rheological properties over varying low shear conditions as encountered in the annular region of the bore hole during drilling operations and, further, that the subject fluids are stable to elevated temperatures and various salts commonly found in drilling fluids.

EXAMPLE IV 29 parts of magnesium chloride hexahydrate was dissolved in 71 parts water. To 235 parts of the solution was added an excess of base in the form of calcium oxide at 90% stochiometry and the remainder being sodium hydroxide or merely additional calcium oxide. The obtained fluid compositions were each then circulated through a stainless steel tube having an I.D. of 0.0157 in for 30 minutes and then diluted to a hydroxyl magnesium agent concentration of 2.7 per cent. The pH of the resultant solution was measured and the rheological properties were determined using the procedure indicated in Example I, above. The samples were then tested for thermal stability in the manner described in Example II above. The results are indicated in Table II below.

TABLE II

| Sample | Base | Base/Mg Equiv. ratio | initial | | | After Thermal Treatment | | |
| --- | --- | --- | --- | --- | --- | --- | --- | --- |
| | | | pH | n | K | n | K | pH |
| A | mixed | 1.25 | 11.7 | 0.25 | 1.72 | 0.31 | 2.6 | 11.7 |
| B | mixed | 1.5 | 11.7 | 0.21 | 3.75 | 0.18 | 7.8 | 11.8 |
| C | mixed | 1.75 | 11.8 | 0.19 | 7.7 | 0.15 | 10.7 | 11.8 |
| D | CaO | 1.25 | 11.8 | 0.21 | 1.9 | 0.28 | 5.0 | 11.9 |
| E | CaO | 1.5 | 11.7 | 0.20 | 2.9 | 0.27 | 5.7 | 11.8 |
| F | CaO | 1.75 | 11.7 | 0.20 | 3.3 | 0.25 | 5.5 | 12.2 |

EXAMPLE V

For comparative purposes, a commercially available light-burnt MgO was mixed in water (5% concentration of MgO) under high speed agitation for one hour. The resultant suspension was tested for rheology properties in accordance to the procedure described in Example I above. The n and K values of the power law model relationship were determined to be 1.0 and less than 0.1, respectively. The resultant fluid was, therefore, a Newtonian fluid not capable of exhibiting the desired pseudoplastic properties.

EXAMPLE VI

A sample of magnesium hydroxide viscosifier fluid was prepared in the same manner as described in Example IV above using both CaO and NaOH as the bases. The resultant fluid was tested for compatibility and stability with respect to common salts and barite, a conventionally accepted weighting agent used in drilling fluid compositions. The pseudoplastic properties of each fluid were tested according to the method described in Example I and II above. The results are given in Table III below.

TABLE III

| Sample | Barite Adjusted Density lb./gal | NaCl % | CaCl₂ % | initial | | | After Thermal* Treatment | | |
| --- | --- | --- | --- | --- | --- | --- | --- | --- | --- |
| | | | | n | K | pH | n | K | pH |
| A | 11 | 0 | 0 | 0.19 | 6.8 | 11.7 | 0.25 | 6.1 | 11.6 |
| B | 15 | 0 | 0 | 0.22 | 12.0 | 11.7 | 0.19 | 7.8 | 11.6 |
| C | 11 | 10 | 0 | 0.31 | 2.8 | 11.3 | 0.23 | 3.8 | 11.3 |
| D | 15 | 10 | 0 | 0.27 | 7.0 | 11.3 | 0.20 | 8.0 | 11.3 |
| E | 11 | 0 | 5 | 0.26 | 3.1 | 11.3 | 0.22 | 4.2 | 11.5 |
| F | 15 | 0 | 5 | 0.20 | 5.3 | 11.4 | 0.24 | 8.2 | 11.3 |

*150° F. for 16 hrs.

EXAMPLE VII

A drilling fluid was formed using the procedure described in Example IV above with both CaO and NaOH as the bases used. The resultant hydroxy magnesium agent containing fluid was circulated through a stainless steel tube having an I.D. of 0.0157 in. and then diluted to a concentration of 3 per cent. The initial pH was adjusted to between 11.9 and 12.2 by the addition of NaOH. The resultant fluids were divided into samples which were loaded with salts and/or Glen Rose shale (a non-swelling clay material conventionally used to simulate rock cuttings) to determine the fluids compatability and stability at ambient temperatures and after subjection to an elevated temperature for a sustained period. The rheology was determined according to the procedures described in Examples I and II above. The n and K values according to the power law model relationship is given below.

TABLE IV

| Sample | GRS % | NaCl % | CaCl$_2$ % | Initial | | | After Thermal Treatment | | |
| --- | --- | --- | --- | --- | --- | --- | --- | --- | --- |
| | | | | n | K | pH | n | K | pH |
| A | 5 | 0 | 0 | 0.18 | 12.5 | 12.2 | 0.31 | 4.8 | 12.3 |
| B | 15 | 0 | 0 | 0.18 | 16.5 | 12.2 | 0.30 | 7.9 | 12.0 |
| C | 5 | 10 | 0 | 0.15 | 12.8 | 11.9 | 0.37 | 2.50 | 11.8 |
| D | 15 | 10 | 0 | 0.16 | 17.0 | 11.9 | 0.30 | 3.50 | 11.5 |
| E | 5 | 0 | 5 | 0.16 | 13.9 | 12.1 | 0.26 | 5.6 | 12.1 |
| F | 15 | 0 | 5 | 0.18 | 14.0 | 12.0 | 0.53 | 0.48 | 12.3 |

EXAMPLE VIII

A drilling fluid was formed by introducing 5 parts of a commercially available light-burnt magnesium oxide into 9.5 parts of water. The mixture was agitated using a high speed mixer over a period of about 100 hours. The pH of the resultant slurry was about 11.5. The slurry was circulated for about 30 minutes through a stainless steel tube having an I.D. of 0.0157 inch. The resultant slurry had a hydroxyl magnesium agent concentration of 7.2 per cent.

Rheological properties of the resultant slurry were determined using the procedures given in Examples I and II above. The n and K values were 0.16 and 7.0 initially and 0.21 and 3.7 after thermal treatment.

EXAMPLE IX

For comparative purposes, a sample of drilling fluid was prepared from one liter of water containing a mixture of salts as follows: 150 gm of magnesium chloride hexahydrate, 130 gm of sodium chloride, 45 gm of magnesite (magnesium carbonate) and 10 gm of ammonium chloride. Adjustment of the alkalinity of the fluid to a pH of 10 was attempted. 62.8 gm of calcium hydroxide were required to adjust the pH to above 10. The final pH was 10.6.

The sample was tested for its rheological properties both before and after thermal treatment in accordance with the procedures described in Examples I and II above and was found to be Newtonian in both instances.

While the invention has been described in connection with certain preferred embodiments, it is not intended to limit the invention to the particular forms set forth, but, on the contrary, it is intended to cover such alternatives, modifications and equivalents as defined by the appended claims.

I claim:

1. In a water-based, clay-free drilling fluid suitable for circulating in a bore hole while drilling said bore hole into subterranean formations wherein the fluid includes water, a water-loss inhibitor and a viscosifying agent to form an aqueous system having a pH of at least about 11; wherein the improvement comprises that said viscosifying agent is a hydroxyl containing magnesium agent of the reaction product formed in an aqueous medium at a temperature of from about ambient to about 40° C. under high speed agitation between a magnesium salt which is substantially completely soluble in water at ambient conditions and a water soluble base selected from the group consisting of alkali metal oxide, alkali metal hydroxide, alkali metal salt of a weak acid and ammonium hydroxide said aqueous medium containing said reaction product being further subjected to high shear forces; said hydroxyl containing magnesium viscosifying agent being present in from about 1 to 10 per cent by weight based on the weight of the water to impart pseudoplastic property to said aqueous system.

2. The water-based, clay-free drilling fluid of claim 1 wherein the aqueous system has a pH of from about 11 to 12.5.

3. The water-based, clay-free drilling fluid of claim 1 wherein the water soluble, inorganic magnesium salt is selected from the group consisting of magnesium halide, magnesium sulfate, magnesium nitrate and magnesium acetate; the water soluble base is selected from the group consisting of an alkali metal oxide and an alkali metal hydroxide; the magnesium salt and the base are each present in from about 2 to 50 per cent by weight based on the weight of the water of the aqueous forming medium.

4. The water-based, clay-free drilling fluid of claim 1 wherein the pseudoplastic property of said aqueous system is defined by the formula $$\tau = K(\dot{\gamma})^n$$

in which $\tau$ represents the shear stress of the aqueous phase; $\dot{\gamma}$ represents the shear rate within the range of from about 10 to 400 sec$^{-1}$; K is a constant having the value of shear stress at the shear rate of 1 sec$^{-1}$; and n has a value of up to about 0.4.

5. The water-based, clay-free drilling fluid of claim 4 wherein the magnesium reaction product is formed from magnesium chloride and an alkali metal oxide or hydroxide.

6. The water-based, clay-free drilling fluid of claim 1, 3 or 4 wherein the resultant aqueous system containing the hydroxyl containing magnesium compound suspended or dispersed therein is subjected to high shear forces for a time period of from about 5 to 60 minutes.

7. In the process of drilling a bore hole into a subterranean formation using conventional bore hole drilling equipment and a clay-free, water-based drilling fluid, the improvement comprising circulating in the bore hole while drilling the drilling fluid defined by claim 1, 2, 3, 4 or 5.

* * * * *

UNITED STATES PATENT AND TRADEMARK OFFICE
CERTIFICATE OF CORRECTION

PATENT NO. : 4,264,455  Page 1 of 2
DATED : Apr. 28, 1981
INVENTOR(S) : Jacob Block It is certified that error appears in the above—identified patent and that said Letters Patent is hereby corrected as shown below:

On the cover page of the subject patent delete the drawing and substitute it with the following graph as shown on the attached sheet.

UNITED STATES PATENT AND TRADEMARK OFFICE
CERTIFICATE OF CORRECTION

PATENT NO. : 4,264,455

DATED : Apr. 28, 1981

INVENTOR(S) : Jacob Block

It is certified that error appears in the above—identified patent and that said Letters Patent is hereby corrected as shown below:

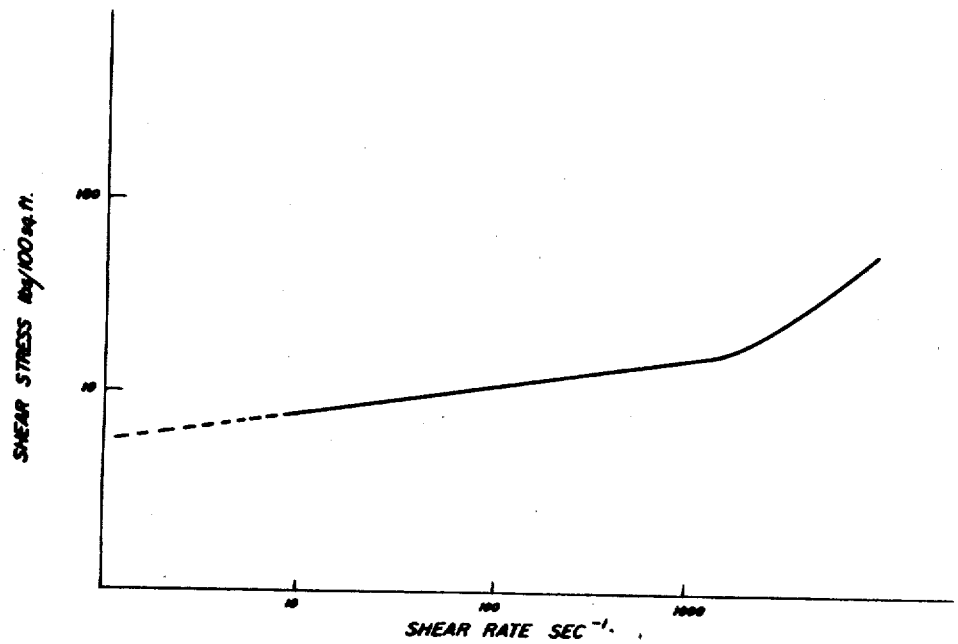

Signed and Sealed this

Twenty-first Day of July 1981

[SEAL]

Attest:

GERALD J. MOSSINGHOFF

Attesting Officer    Commissioner of Patents and Trademarks